(12) United States Patent
Chang et al.

(10) Patent No.: US 8,908,195 B2
(45) Date of Patent: Dec. 9, 2014

(54) METHOD FOR MEASURING CRACKS REMOTELY AND DEVICE THEREOF

(71) Applicant: National Applied Research Laboratories, Taipei (TW)

(72) Inventors: Wen-Yi Chang, Hsinchu (TW); Franco Lin, Hsinchu (TW); Lung-Cheng Lee, Hsinchu (TW); Hung-Ta Hsiao, Hsinchu (TW); Shou-I Chen, Hsinchu (TW); Yu-Chi Sung, Hsinchu (TW); Tai-Shan Liao, Hsinchu (TW); Chih-Yen Chen, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 0 days.

(21) Appl. No.: 13/799,095

(22) Filed: Mar. 13, 2013

(65) Prior Publication Data
US 2014/0132965 A1    May 15, 2014

(30) Foreign Application Priority Data
Nov. 15, 2012   (TW) ............................ 101142711 A

(51) Int. Cl.
*G01B 11/06* (2006.01)
*G01B 11/02* (2006.01)

(52) U.S. Cl.
CPC ..................... *G01B 11/02* (2013.01)
USPC ........................................... 356/634

(58) Field of Classification Search
CPC ...................................... G01B 11/043
USPC ........................................... 356/634
See application file for complete search history.

(56) References Cited

U.S. PATENT DOCUMENTS

| 4,671,674 A * | 6/1987 | Detronde .......................... 374/5 |
| 6,711,284 B1 * | 3/2004 | Koide ............................ 382/141 |
| 2006/0274930 A1 * | 12/2006 | Laurent et al. ................. 382/141 |

* cited by examiner

*Primary Examiner* — Tarifur Chowdhury
*Assistant Examiner* — MD Rahman
(74) *Attorney, Agent, or Firm* — Rosenberg, Klein & Lee

(57) ABSTRACT

The present invention relates to a method for measuring cracks remotely and the device thereof. First, multiple laser spots with known a shape are projected onto a remote wall and beside a crack. Then, by using geometric calculations, the relative coordinates of the laser spots on the wall and the real distance can be given and used as the reference length of the crack. Next, a camera is used for taking a picture of the remote crack along with the laser spots; the image identification technology is used for calculating the relevant parameters of the crack. Thereby, to acquire the parameters of the crack, a user needs not to be present at the site for measuring at a short distance or placing a reference object, and thus providing safety and convenience.

11 Claims, 13 Drawing Sheets

METHOD FOR MEASURING CRACKS REMOTELY AND DEVICE THEREOF

FIELD OF THE INVENTION

The present invention relates generally to a method for measuring cracks remotely and the device thereof, and particularly to a method for measuring cracks remotely and the device thereof by using the deformation of laser patterns composed by laser beams for analyzing the length and width parameters of the cracks.

BACKGROUND OF THE INVENTION

Cracks in the walls of a building are warnings of safety in structure. Without prompt reinforcement, even a tiny crack might broaden increasingly and expose the internal cramp iron, which will increase the possibility rusting and endanger the building.

Due to its geographical factors, Taiwan suffers disasters such as typhoons, flood, and earthquakes frequently. Thereby, buildings or constructions there have higher risks of generating cracks and then age and deteriorate gradually. This threatens people's lives and property seriously. Accordingly, when the maintenance department of constructions is maintaining and managing bridges, dams, tunnels, how to inspect and track the status of cracks firmly has become an important and unavoidable subject.

Traditionally, when cracks occur in concrete buildings, quantization of the length and width of the cracks is done by manual and contact measurement, namely, by using handheld crack gauges or ultrasonic inspection. Nonetheless, manual measurement is time consuming and labor intensive. Besides, the measurement results are not unique. Moreover, some locations of cracks are uneasy to reach, making it difficult for a large number of measurements.

In recent years, there are an increasing number of experts or scholars who use image recognition to extract crack information from images. However, although these methods according to the prior art can possibly give crack information, such as length and width, from images, the measurements are the numbers of pixels on images. Consequently, the real parameters of cracks can be given only after conversion via reference scales. Currently, there is still no simple and practical method for providing reference scales on images.

SUMMARY

An objective of the present invention is to provide a method for measuring cracks remotely. First, laser beams are used for illuminating one side of a crack. Then, pictures are taken and the image analysis is processed. A user completely needs not to measure closely or put a reference object. Thereby, the measurement is safe and convenient.

Another objective of the present invention is to provide a method for measuring cracks remotely. By taking advantage of the low dispersion property of laser beams, measurement can be done remotely without influencing its accuracy.

Still another objective of the present invention is to provide a method for measuring cracks remotely. After acquiring relevant parameters and taking pictures, the analysis can be processed. Thereby, its can be applied to an unmanned monitoring system and transmitting data to a remote site for unified analysis rapidly.

Still another objective of the present invention is to provide a device for measuring cracks remotely, which projects the required laser beams to the walls having cracks for measuring the cracks accurately using the method according to the present invention.

Accordingly, the present invention discloses a method for measuring cracks remotely and the device thereof. The method comprises steps of moving a laser projector, so that the laser projector is parallel with the normal of a wall; moving a horizontal angle and a vertical angle of the laser projector, so that the laser projector aims at a projecting point located on one side of a crack in the wall; projecting a laser pattern to the projecting point; taking a picture of the projecting point and the crack and giving a deformation image; and restoring the deformation image to an orthogonal image and giving a parameter of the crack. By using these steps, a user can acquire the length and width values accurately of the crack safely.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
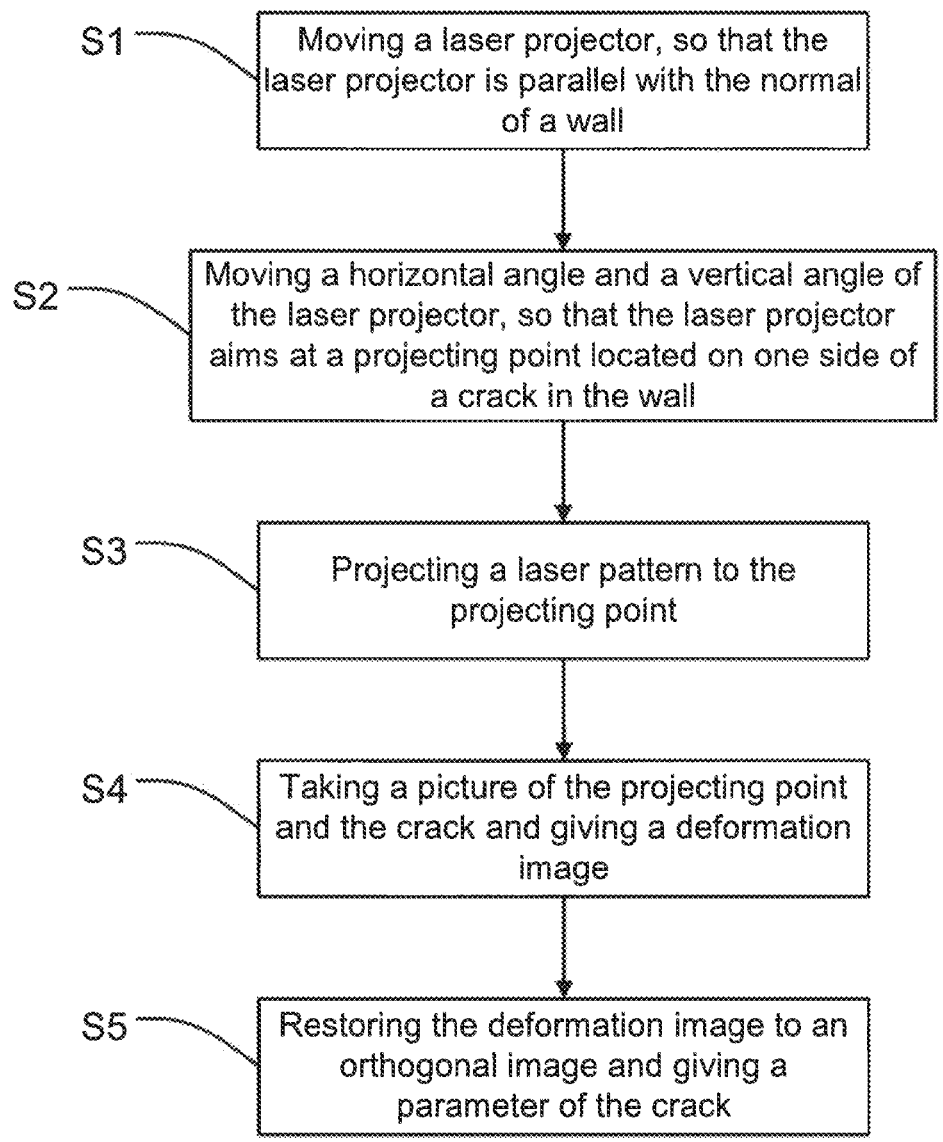
FIG. 1 shows a flowchart according to the present invention.

First, FIG. 1 shows a flowchart according to the present invention. The steps comprise:

Step S1: Moving a laser projector, so that the laser projector is parallel with the normal of a wall;

Step S2: Moving a horizontal angle and a vertical angle of the laser projector, so that the laser projector aims at a projecting point located on one side of a crack in the wall;

Step S3: Projecting a laser pattern to the projecting point;

Step S4: Taking a picture of the projecting point and the crack and giving a deformation image; and Step S5: Restoring the deformation image to an orthogonal image and giving a parameter of the crack.

Figure 2:
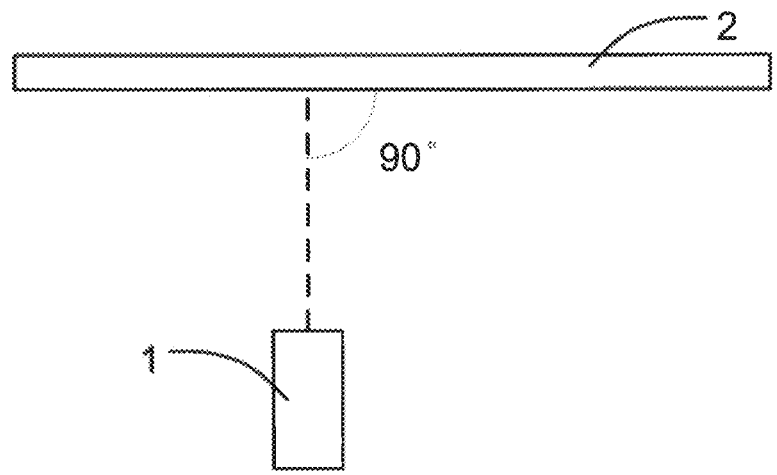
FIG. 2 shows a schematic diagram of aligning the laser projector to be parallel with the normal direction of the wall according to the present invention.

According to the present invention, as shown in FIG. 2, the laser projector 1 is first disposed at a fixed distance from the wall 2 with a crack. Thanks to the property of laser beams, this distance can be very long. Thereby, the problem caused by the landform between the observed wall 2 and the location installing the laser projector 1 can be ignored. This laser projector 1 can be attached to a tripod and its projecting direction is adjusted to be parallel with the normal of the wall 2.

Figure 3A:
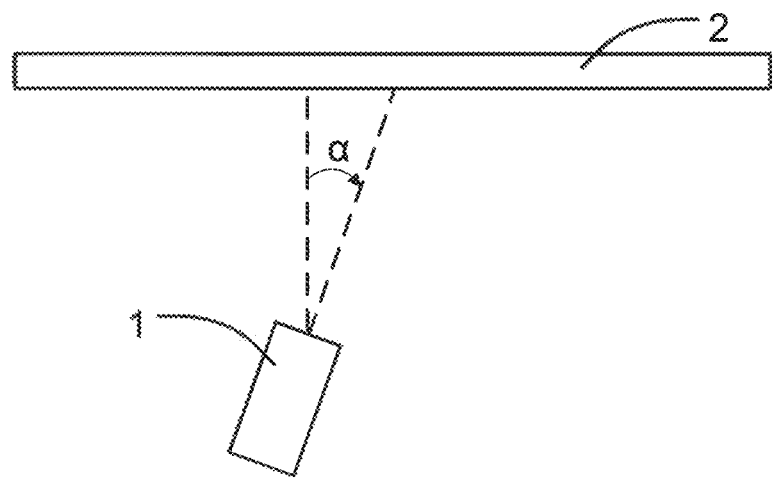
FIG. 3A shows a schematic diagram of moving the horizontal angle of the laser projector according to the present invention.
Figure 3B:
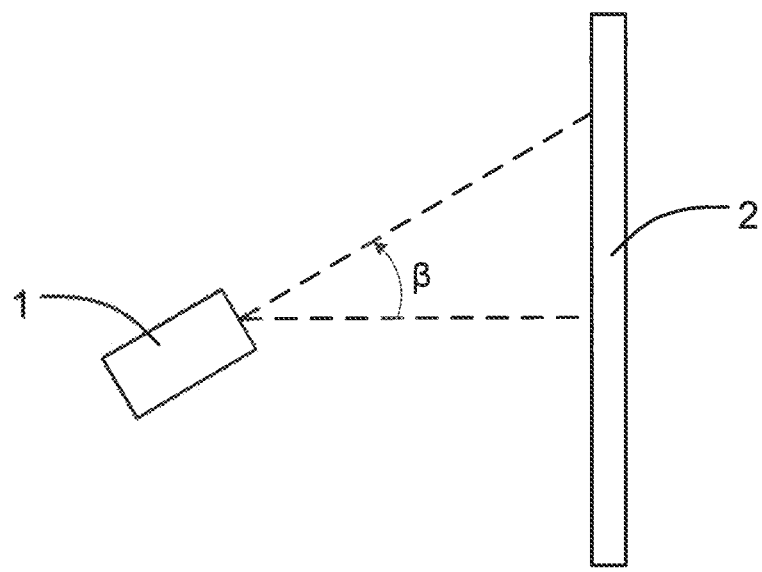
FIG. 3B shows a schematic diagram of moving the vertical angle of the laser projector according to the present invention.
Figure 3C:
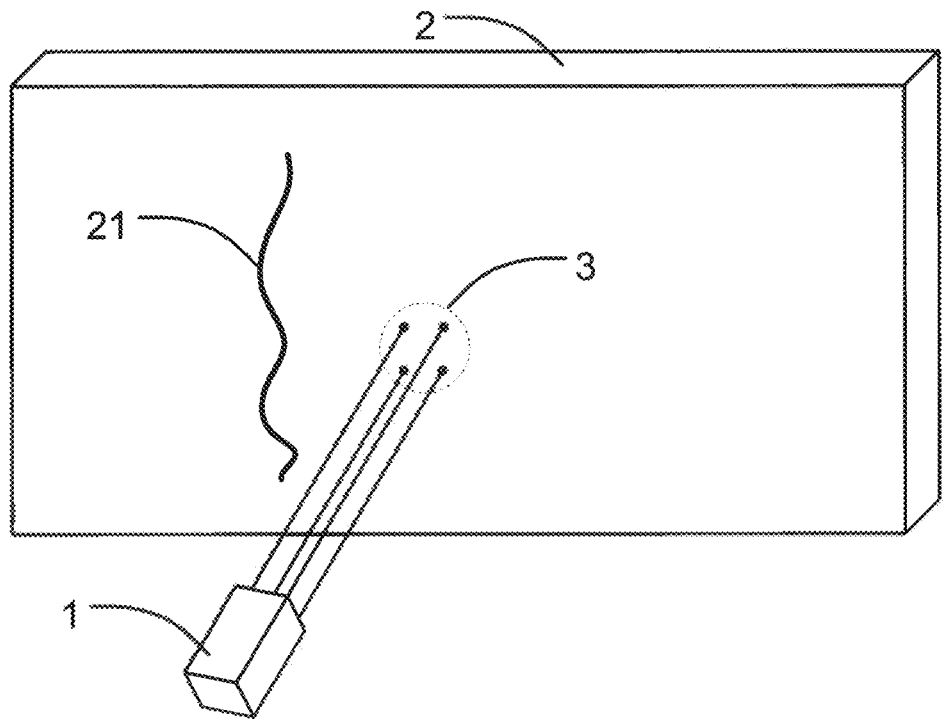
FIG. 3C shows a schematic diagram of projecting the laser pattern to the projecting point according to the present invention.

Next, please refer to FIGS. 3A to 3C. A user moves the laser projector 1 by a horizontal angle $\alpha$ and a vertical angle $\beta$ to aim the laser projector 1 at the projecting point 3. In this stage, the order of adjusting the horizontal and vertical direction is not limited, once the difference in the angles between the final projecting point 3 and the original initial location can be recorded, the subsequent operations can be processed.

In addition, the ranges of the horizontal angle $\alpha$ and the vertical angle $\beta$ can suit local conditions. After movement, the projecting point 3 is located on one side of the crack 21 in the wall 2.

Figure 4:
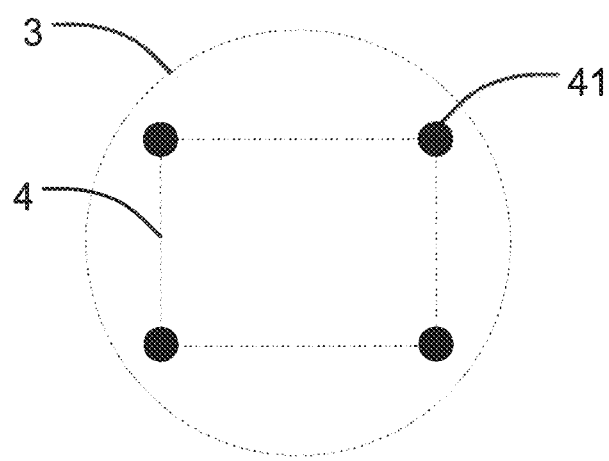
FIG. 4 shows a cross-sectional view of the laser pattern according to the present invention.

Then, in the step S3, referring to FIG. 4, the moved laser projector 1 projects a laser pattern 4 to the projecting point 3. This laser pattern 4 has at least four laser light spots 41. The laser projector 1 according to the present invention can be a parallel laser projector or an angle-adjustable laser projector. The difference between the two types is shown in this step S4. If a parallel laser projector is adopted, the laser projector 1 will emit parallel laser beams simultaneously and arranges in a rectangle. If an angle-adjustable laser beam is adopted, the projected shape by the laser beams is a known shape, such as a rectangle, and can be enlarged or shrunk. The distance between the laser projector 1 and the wall 2 can be given by a laser range finder. Accordingly, the enlarged or shrunk size of the rectangular light spots can be given by geometric calculations. No matter what type of laser projector 1 is used, the relative coordinates of the laser light spots 41 on the wall can be calculated by means of the angle between the laser projector 1 and the normal of the wall 2, namely, the horizontal angle $\alpha$ and the vertical angle $\beta$.

Figure 5A:
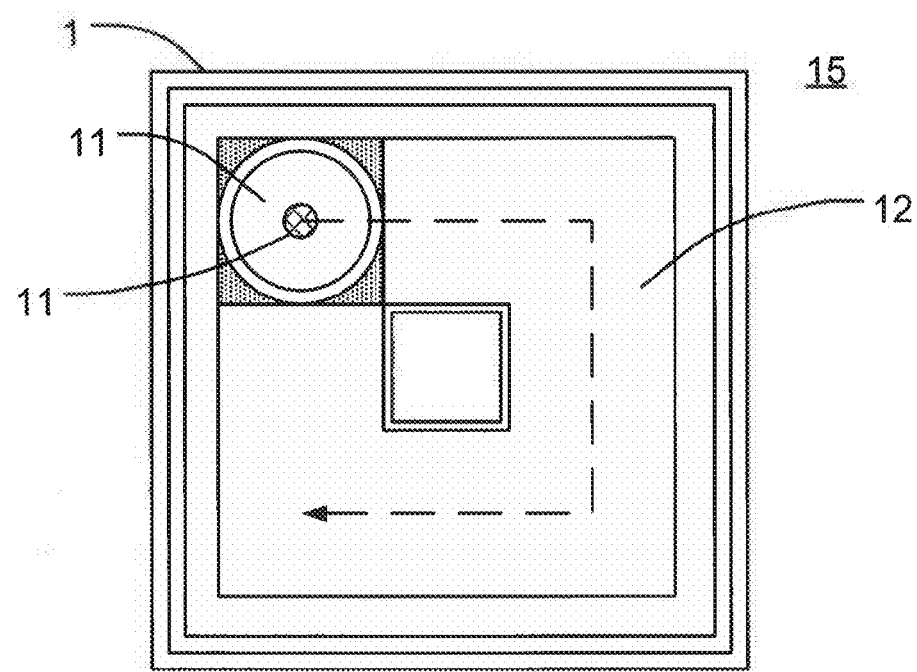
FIG. 5A shows a schematic diagram of the projecting opening of the parallel laser projector according to the present invention.

It is difficult to design a laser projector 1 capable of emitting parallel laser beams simultaneously. It is because even a tiny error will be expanded to an unnegligible shift. Hence, the present invention also improves the structure of the laser projector 1. As shown in FIG. 5A, on the projecting plane of the parallel laser projector 1, the number of the multiple projecting openings 11 of the laser projector 1 is reduced to one. By using a preset sliding track 12, the projecting opening 1 can move along the sliding track 12 inside the laser projector 1 and thus projecting completely parallel laser beams. In the subsequent picture taking, the shutter time can be extended for giving the same effect of multiple projecting openings 11 arranged together.

Figure 5B:
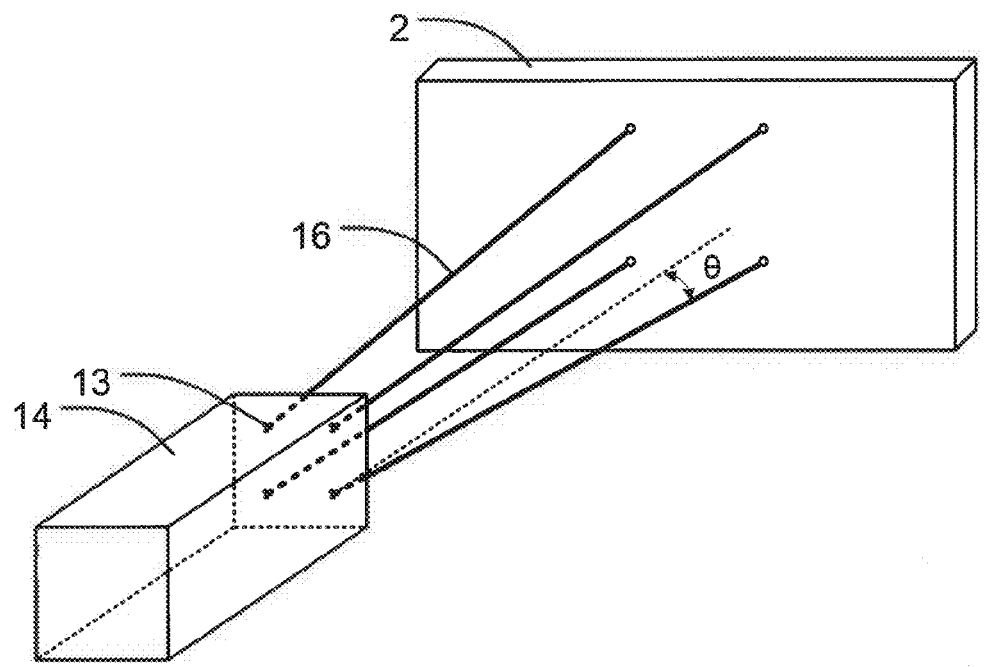
FIG. 5B shows a schematic diagram of projection of the angle-adjustable laser projector according to the present invention.

FIG. 5B shows a schematic diagram of projection of the angle-adjustable laser projector according to the present invention. There are laser sources 13 on the projecting opening of the projecting plane of the projecting body 14. The laser beams 16 are projected through the projecting opening. In addition, there is an adjustable angle $\theta$ between the laser beams 16 and the normal of the projecting plane. After the laser beams 6 are projected onto the wall 2, the laser pattern is formed and its size is adjusted according to the angle $\theta$.

Figure 6:
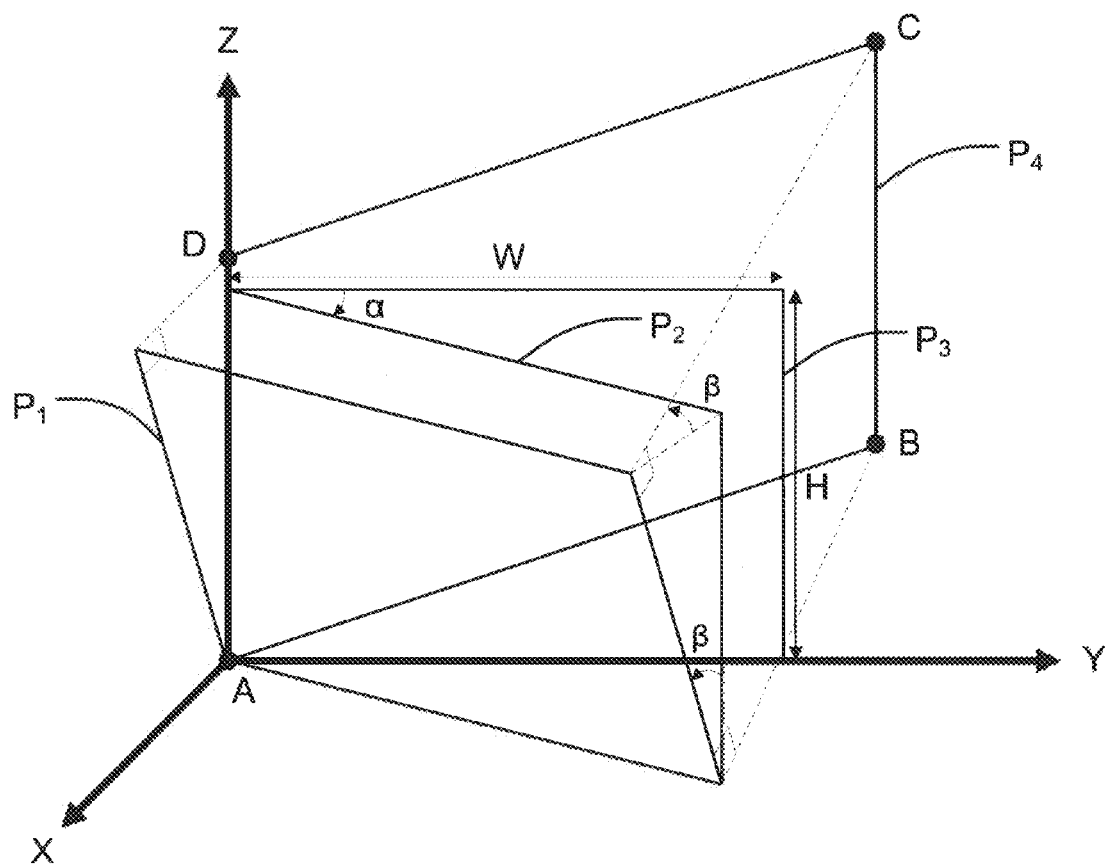
FIG. 6 shows a schematic diagram of the projection coordinate of the parallel laser projector according to a preferred embodiment of the present invention.

In the present invention, a parallel laser projector is used as an example. Refer to FIG. 6. The first pattern $P_1$ is a section of the parallel laser beams emitted by the laser projector 1. The second pattern $P_2$ is perpendicular to the XY plane after modifying the vertical angle $\beta$ of the first pattern $P_1$. The third pattern $P_3$ is parallel with the YZ plane after modifying the horizontal angle $\alpha$ of the second pattern $P_2$. The fourth pattern $P_4$ is the deformation image formed on the wall 2 by the laser projector 1. The images projected by the laser projector 1 have multiple laser light spots. Instead of projecting real rectangular images, $P_1$, $P_2$, $P_3$, and $P_4$ shown in FIG. 6 are virtual laser patterns formed by connecting multiple laser light spots.

Next, in the step S4, the user takes a picture of the projecting point 3 and the crack 21 and giving a deformation image. At this stage, a camera or a mobile phone with camera is used for taking the picture of the laser light spots 41 at the projecting point 3 along with the crack 21. After acquiring the deformation image, the horizontal angle $\alpha$, the vertical angle $\beta$, and the crack 21 can be uploaded to the remote image analysis system via the wireless transmission technology for subsequent image analysis and processing. Furthermore, it is feasible to acquire the parameters of the crack immediately by using a programmable camera processes the image analysis in real-time.

Figure 7:
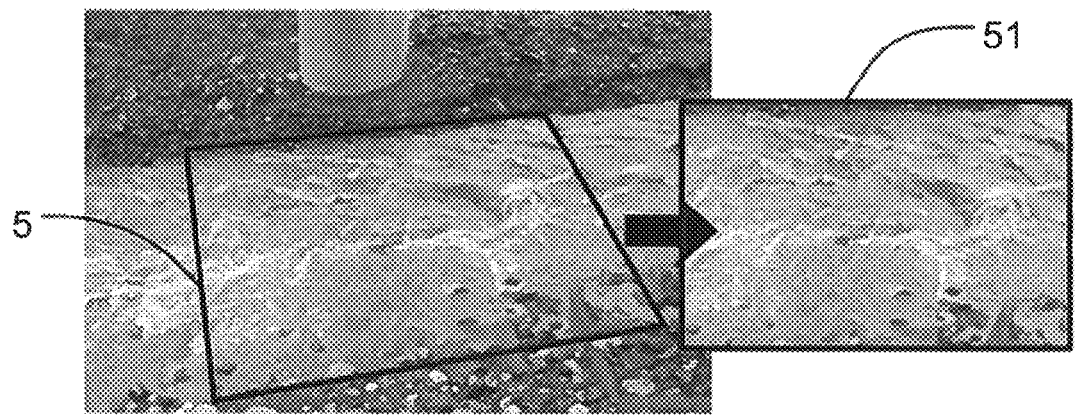
FIG. 7 shows a deformation image and an orthogonal picture according to a preferred embodiment of the present invention.

After acquiring the required coordinate information of image and the restoring parameters of relevant angles, the user can perform image analysis, namely, restoring the deformation image to an orthogonal image such as the conversion from the deformation image 5 to the orthogonal image 51 shown in FIG. 7. At this time, according to the rotational angles (the horizontal angle $\alpha$ and the vertical angle $\beta$) of the laser projector, the deformation coordinates of A, B, C, and D points on the wall 21 (the YZ plane) are given by using the following formulas (Equation 1):

$$\begin{cases} (y, z)_A = (0, 0) \\ (y, z)_B = (W/\cos\alpha, W\tan\alpha\tan\beta) \\ (y, z)_C = (W/\cos\alpha, H/\cos\beta + W\tan\alpha\tan\beta) \\ (y, z)_D = (0, H/\cos\beta) \end{cases}$$

Then, identify the locations of the laser light spots $(y', z')_A \sim (y', z')_D$ in the taken deformation image using the image processing technology. Afterwards, substitute the coordinates of the four points A, B, C, and D before and after deformation into the following, formulas (Equation 2) and solve for the coefficients $c_1 \sim c_8$:

$$y' = c_1 y + c_2 z + c_3 yz + c_4$$

$$z' = c_5 y + c_6 z + c_7 yz + c_8$$

With the known coefficients $c_1 \sim c_8$, Equation 2 can be used for restoring the whole deformation image to the orthogonal image and giving the reference length between the laser light spots 41.

Next, there are two methods for acquiring the parameters of image identification for the crack 21. The first is to identify the location of the crack 21 on the original deformation image in the (y', z') coordinate system. Then, Equation 2 is used for converting to the practical (y, z) plane coordinates, which represent the real coordinates. Thereby, the real length and width parameters of the crack 21 can be calculated in the practical coordinate system.

The other method is to identify the location of the acquired orthogonal image of the crack 21. Then, by comparing the reference length between the crack 21 and the laser pattern 4, the real length and width parameters of the crack 21 can be given.

If the light is insufficient or the measurement is performed in the night, for enhancing the image clarity of the image for the crack, according to the method of the present invention, other light sources can be used as well. The high condensing capability of laser beams will not be influenced by the auxiliary light sources.

For practical applications, the examples of the present invention are shown in the following:

Example 1

Figure 8A:
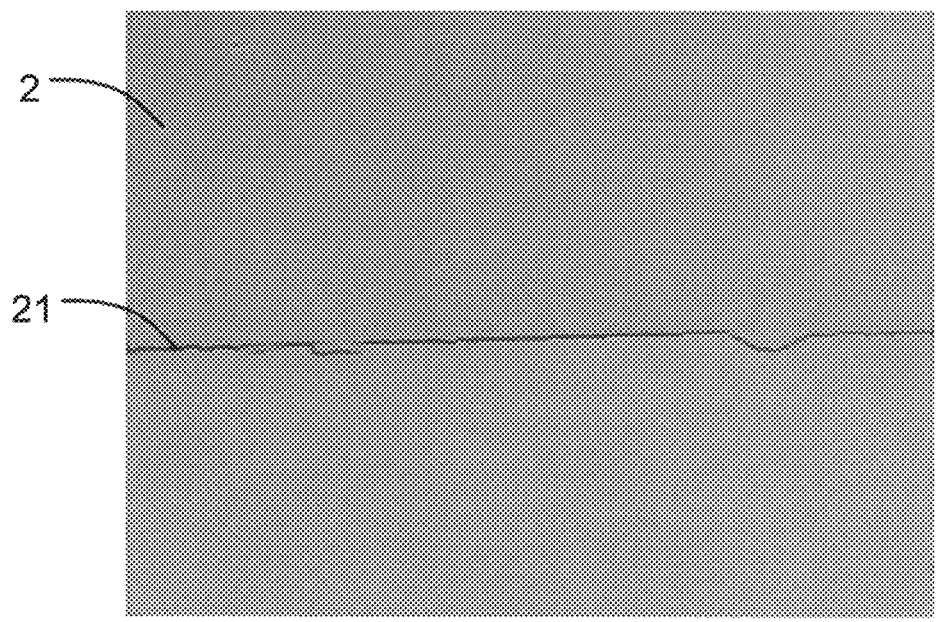
FIGS. 8A~8D show practical operating pictures of the example 1 according to the present invention.
Figure 8B:
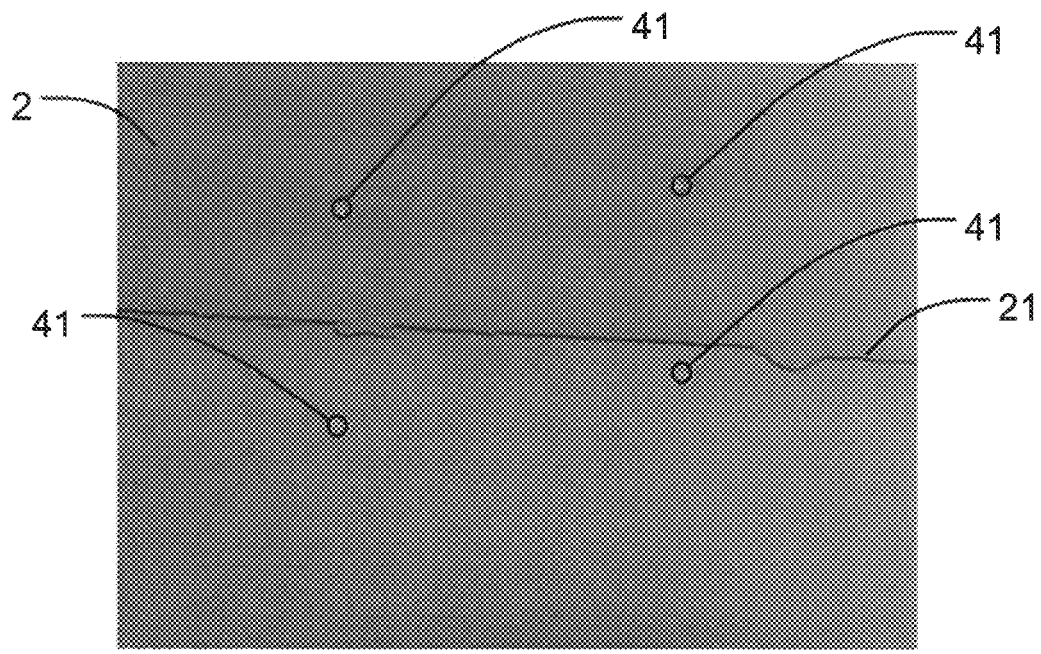

A parallel laser projector is adopted. The width of the initial rectangle of the laser projector is 10 centimeters and the height thereof is 5 centimeters. The laser spots are projected on the wall as shown in FIG. 8A with the angles $\alpha=20°$ and $\beta=30°$. Then a camera takes a picture of the crack and the laser spots from another angle and giving the wall and the laser spots shown in FIG. 8B. Next, the formulas are used for calculating and giving the locations of the red spots of the quadrangle on the deformation image.

$$A = [0, 0]$$
$$B = [W/\cos(\alpha), W*\tan(\alpha)*\tan(\beta)] = [10.64, 2.1014]$$
$$C = [W/\cos(\alpha), H/\cos(\beta) + W*\tan(\alpha)*\tan(\beta)]$$
$$= [10.64, 7.8749]$$
$$D = [0, H/\cos(\beta)] = [0, 5.7735]$$

Figure 8C:
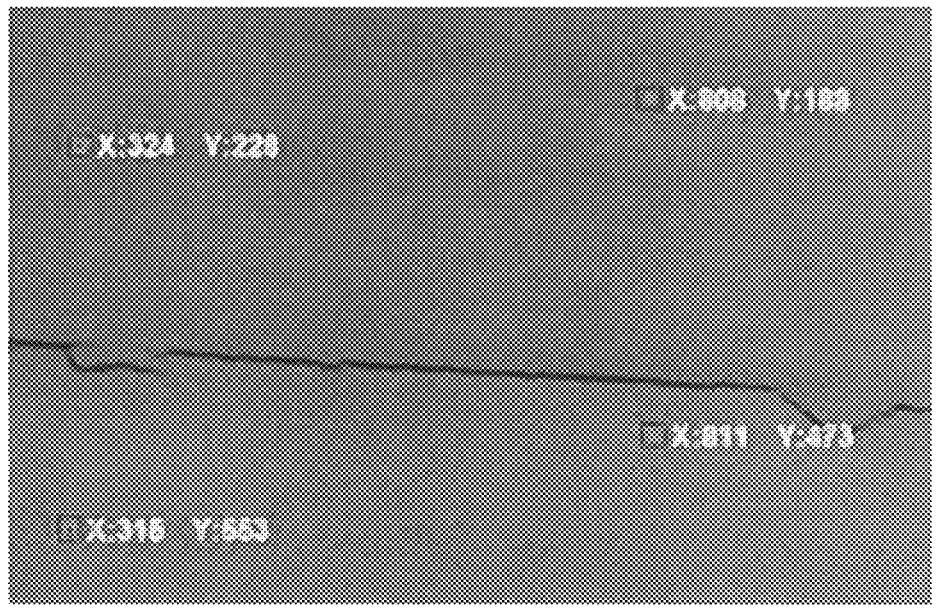
Figure 8D:
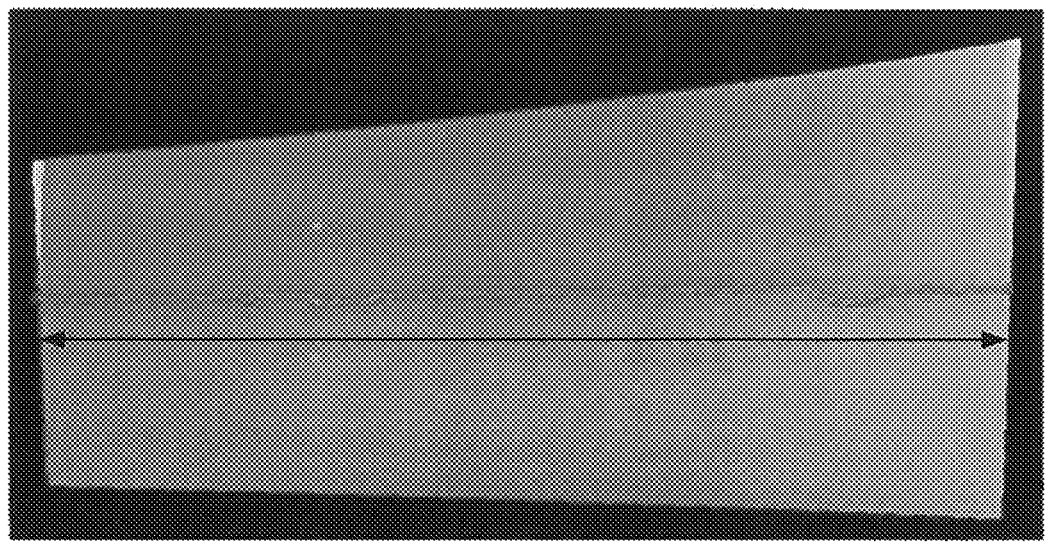

Afterwards, by detecting the red spots, the coordinates of the laser spots on the deformation image can be found, as shown in FIG. 8C. The coordinates of the deformation image is transformed using Equation 2 to 10.64 centimeters by 7.87 centimeters. At this time, the image has converted to the orthogonal image; the proportion of the size of the image to the real size is that 100 pixels is equivalent to 1 centimeter. The coordinate system of the crack is then identified via the calculating procedure for the length of the crack. Pick the starting point and the end point, and accumulate the segments of the crack, as the crack shown in FIG. 8D.

Starting point=[242, 1537]
End point=[2869, 1495]
Distance=28.2 centimeters (given by accumulating segments)

By real measurement, the distance is 28.4 centimeters, meaning that the error is 0.7%.

Example 2

Figure 9A:
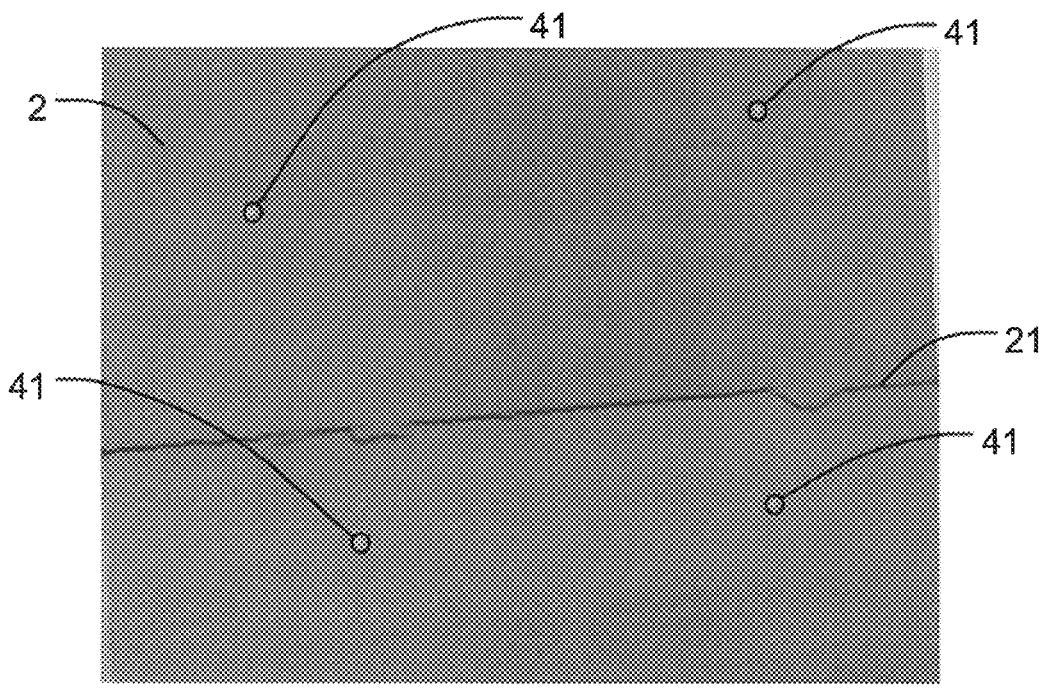
FIGS. 9A~9C show practical operating pictures of the example 2 according to the present invention.

An angle-adjustable laser projector is adopted. The width of the initial rectangle of the laser projector is 10 centimeters and the height thereof is 5 centimeters. The laser spots are projected on the wall as shown in FIG. 8A with the angles $\alpha=20°$ and $\beta=30°$; Xd=100 centimeters·$\alpha_A=0°$, $\beta_A=0°$, $\alpha_B=1°$, $\beta_B=-1°$, $\alpha_C=1°$, $\beta_C=1°$, $\alpha_D=-1°$, $\beta_D=1°$. Then a camera takes a picture of the crack and the laser spots from another angle and giving the wall and the laser spots shown in FIG. 9A. Next, the formulas are used for calculating and giving the locations of the red spots of the quadrangle on the deformation image:

A=[0,0]
B=[12.9959, 0.0115]
C=[13.0988, 11.0265]
D=[−2.3426, 7.8532]

Figure 9B:
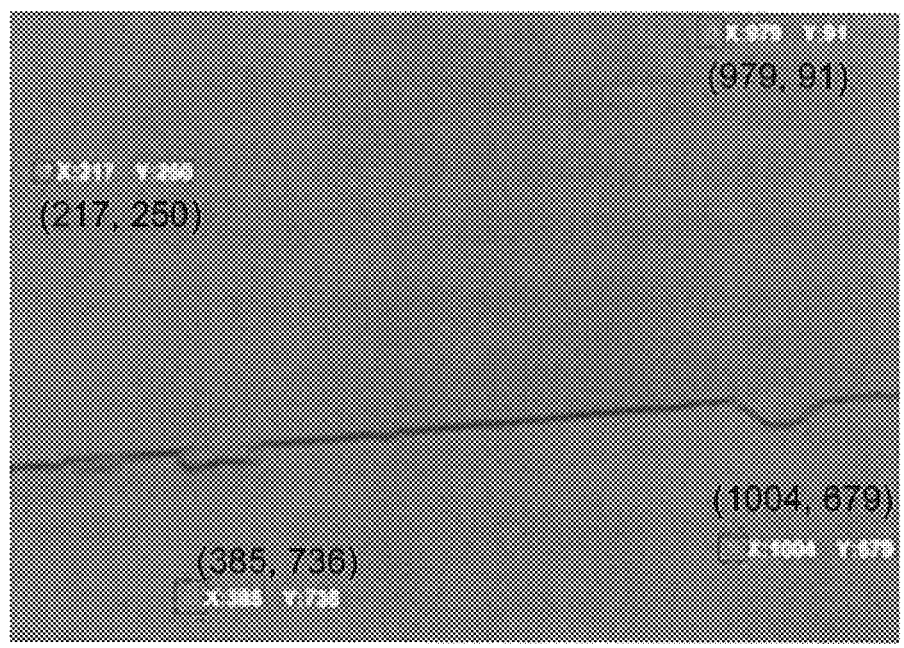
Figure 9C:
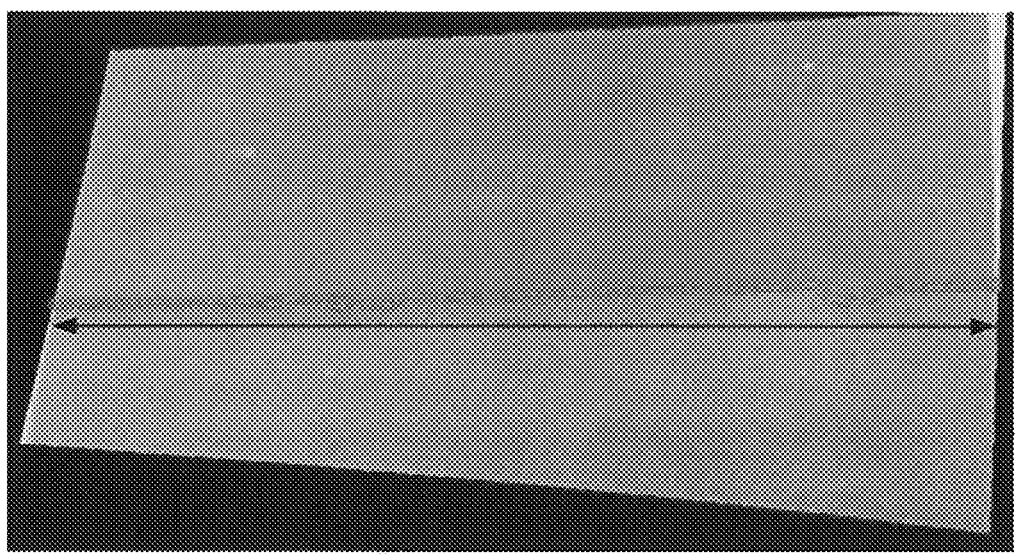

Afterwards, by detecting the red spots, the coordinates of the laser spots on the deformation image can be found, as shown in FIG. 9B. The coordinates of the deformation image are converted using the formulas to the orthogonal image. The coordinate system of the crack is then identified via the calculating procedure for the length of the crack. Pick the starting point and the end point, and accumulate the Segments of the crack, as the crack shown in FIG. 9C.

Starting point=[140, 1055]
End point=[2728, 979]
Distance=27.84 centimeters (given by accumulating segments)

By real measurement, the distance is 28.4 centimeters, meaning that the error is 2%.

Example 3

Figure 10A:
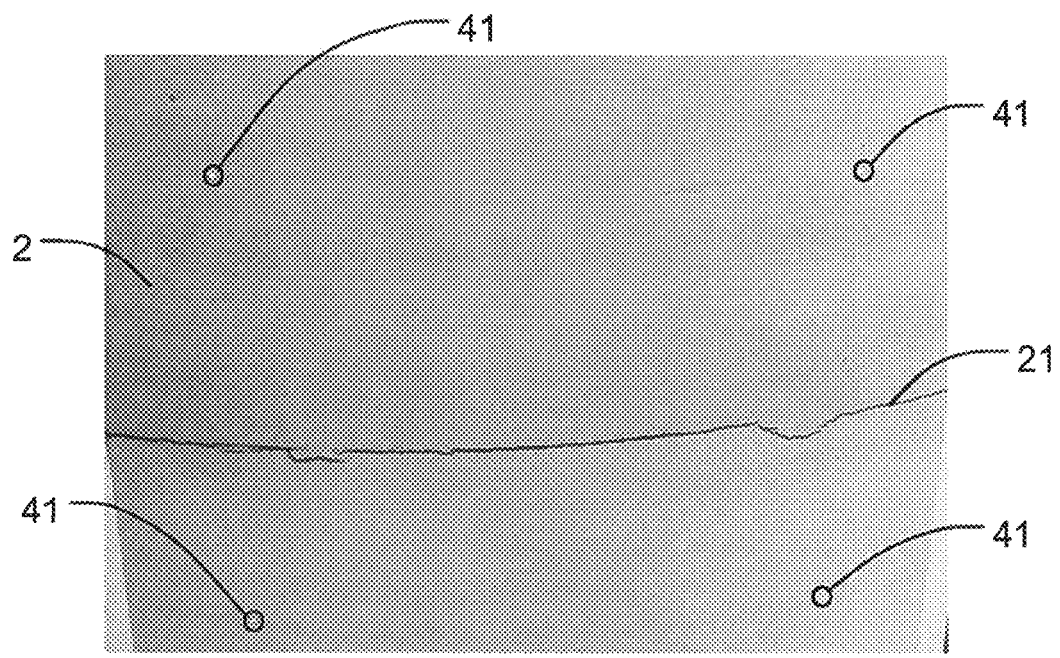
FIGS. 10A~10D show practical operating pictures of the example 3 according to the present invention.

The crack according to this embodiment is on a column, so the crack is located on a curved surface. The laser projector projects four laser beams on the column. Then a camera takes a picture of the crack and the laser spots from another angle and giving the nonorthogonal image shown in FIG. 10A. Next, a laser range finder is used for giving the coordinates of the light spots, respectively:

A=[0, 0, 0]
B=[5, 17, 0]
C=[5, 17, 13.6]
D=[0, 0, 13.6]

Figure 10B:
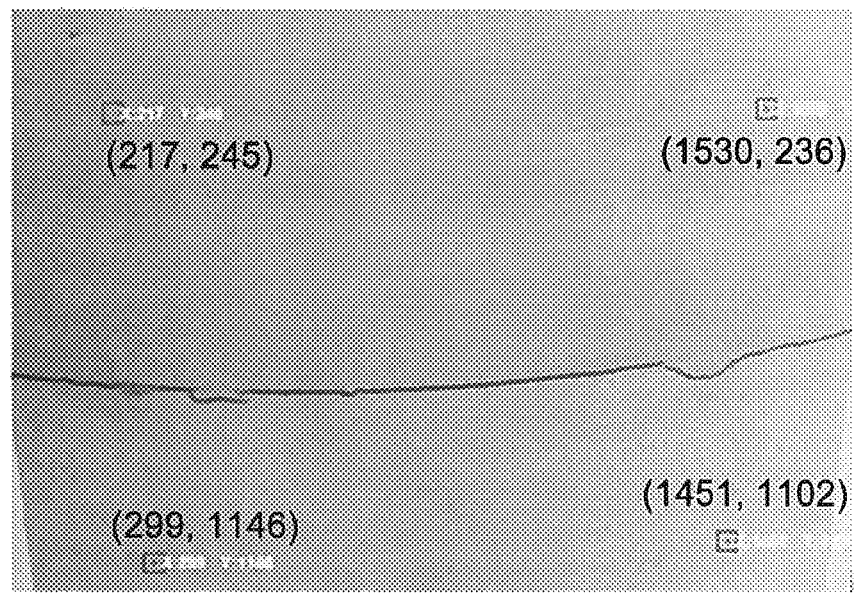

Afterwards, by detecting the red spots, the coordinates of the laser spots on the deformation image can be found, as shown in FIG. 10B. The deformation image is then converted to the orthogonal image via the formulas. By calculating the function of the target curved surface, namely, shifting all point to the right and downwards by 600 pixels, substitute the coordinates of the four spots to the function of the curved surface and re-project to the three-dimensional space. It is truly a curved surface.

A=[0, 600, 600]
B=[500, 2300, 600]
C=[500, 2300, 1960]
D=[0, 600, 1960]

By substitute them to $x=ay^2+byz+cz^2+d$, it gives:
a=0.0001, b=c=0, d=−36.5112

The crack is then identified via the calculation for the length of the crack. Pick the starting point and the end point, and accumulate the segments of the crack. The straight-line distance does not take the influence of the depth x of the crack into account. On the contrary, the curved-line distance does.

Figure 10C:
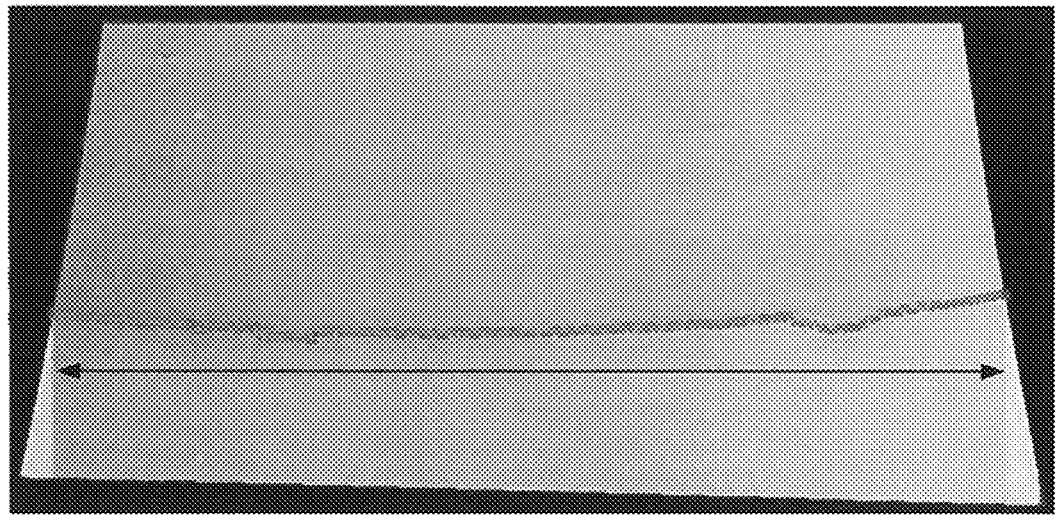

The whole crack (as shown in FIG. 10C):
Starting point=[234, 1383]
End point=[2601, 1307]
Straight-line distance=23.68 centimeters
Curved-line distance=25.85 centimeters (given by accumulating segments)

By real measurement, the distance is 28.4 centimeters, meaning that the error is 9%.

Figure 10D:
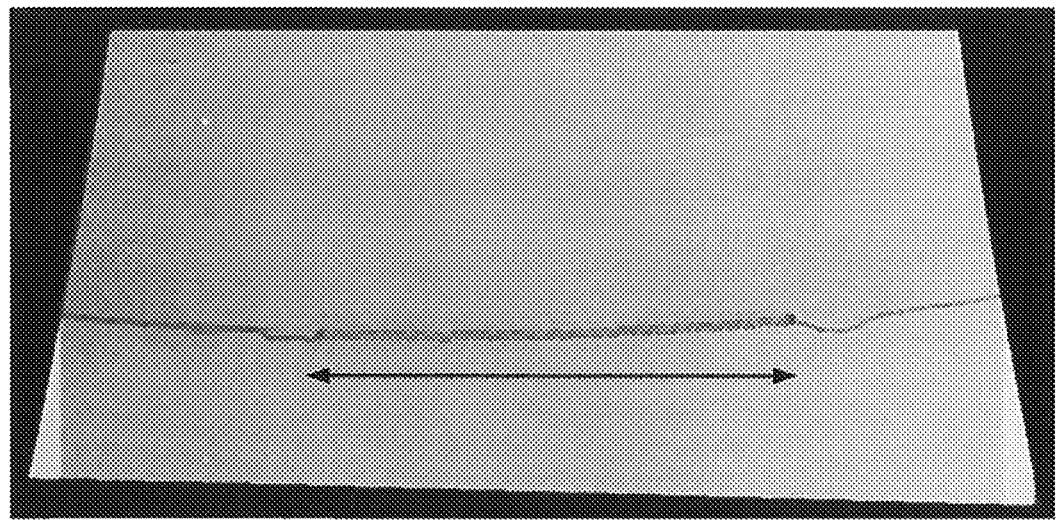

The partial crack (as shown in FIG. 10D, namely, the portion within the laser spots in FIG. 10A):
Starting point=[889, 1455]
End point=[2072, 1392]
Curved-line distance=12.45 centimeters (given by accumulating segments)

By real measurement, the distance is 12.3 centimeters, meaning that the error is 1.2%. The reasons for slightly larger error in the whole crack measurement are due to the error of geometric calibration and the error of the curved-surface function outside the portion of the laser spots.

The present invention discloses a method for measuring cracks remotely and the device thereof. First, multiple laser spots with known a shape are projected onto a remote wall and beside a crack. Then, by using geometric calculations, the relative coordinates of the laser spots on the wall and the real distance can be given and used as the reference length of the crack. Next, a camera is used for taking a picture of the remote crack along with the laser spots; the image identification technology is used for calculating the relevant parameters of the crack. Thereby, a user needs not to be present at the site for measuring at a short distance or placing a reference object. Undoubtedly, the technology according to the present invention provides safety and convenience for remote measurement of cracks.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A method for measuring cracks remotely, comprising steps of:
    moving a laser projector while said laser projector is parallel with the normal of a wall;
    moving a horizontal angle and a vertical angle of said laser projector, so that said laser projector aims at a projecting point located on one side of a crack in said wall;
    projecting a laser pattern to said projecting point;
    taking a picture of said projecting point and said crack, and giving a deformation image; and
    restoring said deformation image to an orthogonal image, and giving a parameter of said crack, said step of restoring said deformation image to said orthogonal image adopts the coordinates, the horizontal angle, and the vertical angle of said deformation image as restoring parameters.

2. The method for measuring cracks remotely of claim 1, wherein said laser projector is a parallel laser projector or an angle-adjustable laser projector.

3. The method for measuring cracks remotely of claim 1, wherein said laser projector has only one projecting opening.

4. The method for measuring cracks remotely of claim 1, wherein said laser pattern has at least four laser spots.

5. The method for measuring cracks remotely of claim 1, wherein said laser pattern is rectangular.

6. The method for measuring cracks remotely of claim 1, wherein said step of giving said parameter of said crack first identify the coordinates of said deformation image after deformation and then use said restoring parameters to restore said deformation image to said orthogonal image.

7. The method for measuring cracks remotely of claim 1, wherein said parameter includes the length and the width of said crack.

8. The method for measuring cracks remotely of claim 1, and, after giving said deformation image, further comprising a step of transmitting said deformation image, said horizontal angle, and said vertical angle coordinates to a remote site.

9. The method for measuring cracks remotely of claim 1, wherein in the step of restoring said deformation image, the parameters of the crack can be acquired immediately by using a programmable camera processes the image analysis in real-time.

10. A method for measuring cracks remotely, comprising steps of:
    moving a laser projector while said laser projector is parallel with the normal of a wall;
    moving a horizontal angle and a vertical angle of said laser projector, so that said laser projector aims at a projecting point located on one side of a crack in said wall;
    projecting a laser pattern to said projecting point;
    taking a picture of said projecting point and said crack, and giving a deformation image; and
    restoring said deformation image to an orthogonal image, and giving a parameter of said crack, said step of giving said parameter of said crack first identify the coordinates of said crack in said deformation image and then convert said coordinates to real coordinates for giving said parameter.

11. A method for measuring cracks remotely, comprising steps of:
    moving a laser projector while said laser projector is parallel with the normal of a wall;
    moving a horizontal angle and a vertical angle of said laser projector, so that said laser projector aims at a projecting point located on one side of a crack in said wall;
    projecting a laser pattern to said projecting point;
    taking a picture of said projecting point and said crack, and giving a deformation image; and
    restoring said deformation image to an orthogonal image, and giving a parameter of said crack, said step of giving said parameter of said crack first identify the coordinates of said crack in said orthogonal image and then give said parameter by referring to the reference length between said crack and said laser pattern.

* * * * *